(12) United States Patent
Neau (10) Patent No.: US 10,507,700 B2
(45) Date of Patent: Dec. 17, 2019

(54) SYSTEM AND METHOD FOR ANALYZING TIRE TREAD PARAMETERS

(71) Applicants: COMPAGNIE GENERALE DES ETABLISSEMENTS MICHELIN, Clermont-Ferrand (FR); MICHELIN RECHERCHE et TECHNIQUE S.A., Granges-Paccot (CH)

(72) Inventor: Xavier Neau, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1058 days.

(21) Appl. No.: 14/893,748

(22) PCT Filed: Jul. 31, 2013

(86) PCT No.: PCT/US2013/052952
§ 371 (c)(1),
(2) Date: Nov. 24, 2015

(87) PCT Pub. No.: WO2015/016888
PCT Pub. Date: Feb. 5, 2015

(65) Prior Publication Data
US 2016/0121671 A1  May 5, 2016

(51) Int. Cl.
*G06T 17/00* (2006.01)
*G06T 17/20* (2006.01)
(Continued)

(52) U.S. Cl.
CPC ............ *B60C 99/006* (2013.01); *G01B 11/22* (2013.01); *G01B 11/24* (2013.01); *G01M 17/027* (2013.01);
(Continued)

(58) Field of Classification Search
None
See application file for complete search history.

(56) References Cited

U.S. PATENT DOCUMENTS

| 5,249,460 A | 10/1993 | Dory et al. |
| 6,069,966 A | 5/2000 | Jones et al. |

(Continued)

FOREIGN PATENT DOCUMENTS

| EP | 2110656 | 10/2009 |
| JP | 201323106 | 2/2013 |

(Continued)

OTHER PUBLICATIONS

Chazelle et al., "Splitting a Delaunay Triangulation in Linear Time," Algorithmica, vol. 34, No. 1, Sep. 2002, pp. 39-46.

(Continued)

*Primary Examiner* — Aniss Chad
(74) *Attorney, Agent, or Firm* — Dority & Manning, P.A.

(57) ABSTRACT

Systems and methods for analyzing tread surface data to assess tire tread parameters, such as irregular wear characteristics of a tire tread, are provided. For example, tread surface data, such as a tread surface map, can be processed to generate a convex hull for the tire. The convex hull can approximate the convex outer surface of the tire. The convex hull can be used as a reference for analyzing the tread surface data. In particular, irregular wear zones in the tire tread can be mathematically concave relative to the convex hull. Comparing the tread surface data to the convex hull can reveal information indicative of irregular wear characteristics of the tire. For instance, the local depth of the measured tread surface data relative to the convex hull can provide a quantitative measure of irregular wear characteristics of the tire.

16 Claims, 8 Drawing Sheets

(51) Int. Cl.
  *B60C 99/00* (2006.01)
  *G01M 17/02* (2006.01)
  *G01B 11/22* (2006.01)
  *G01B 11/24* (2006.01)
  *B60C 11/24* (2006.01)

(52) U.S. Cl.
  CPC .............. *G06T 17/00* (2013.01); *G06T 17/20* (2013.01); *B60C 11/246* (2013.01)

(56) References Cited

U.S. PATENT DOCUMENTS

| | | | |
|---|---|---|---|
| 6,535,281 | B2 | 3/2003 | Conheady et al. |
| 6,539,789 | B1 | 4/2003 | Kostka et al. |
| 6,789,416 | B1 | 9/2004 | Tracy et al. |
| 6,802,130 | B2 | 10/2004 | Podbielski et al. |
| 7,466,430 | B2 | 12/2008 | Braghiroli |
| 8,171,783 | B2 | 5/2012 | Tracy |
| 2003/0034970 | A1 | 2/2003 | Hubeli et al. |
| 2010/0000310 | A1 | 1/2010 | Braghiroli |
| 2010/0130099 | A1 | 5/2010 | Manuel et al. |
| 2011/0246128 | A1 | 10/2011 | Nicholson et al. |

FOREIGN PATENT DOCUMENTS

| | | |
|---|---|---|
| JP | 2013028013 | 2/2013 |
| KR | 10-0291262 | 3/2001 |
| WO | WO 2010/071657 | 6/2010 |
| WO | WO 2011/002439 | 1/2011 |

OTHER PUBLICATIONS

Fabio, "From point cloud to surface: the modeling and visualization problem," International Archives of Photogrammetry, Remote Sensing and Spatial Information Sciences, vol. 34, No. 5, Jan. 1, 2003—11 pages.

H. Lupker et., "Numerical Prediction of Car Tire Wear", Tire Science & Technology, Jul. 2004, vol. 32, No. 3, pp. 164-186.

PCT International Search Report for PCT/US2013/052952, dated Dec. 9, 2013—9 pages.

SYSTEM AND METHOD FOR ANALYZING TIRE TREAD PARAMETERS

FIELD OF THE INVENTION

The present disclosure relates generally to analyzing tire tread parameters, and more particularly, to a system and method for analyzing tread surface data to assess tire tread parameters, such as irregular wear characteristics or groove depth of the tire tread.

BACKGROUND OF THE INVENTION

Systems are known for obtaining tire tread surface data that provides a map of a tread surface of a tire. For instance, laser mapping systems have been used to obtain point by point data measurements of a surface of a tire tread. Such laser mapping systems typically include a laser probe used to measure the distance from the probe to the tire tread surface for each point along the surface of the tire. The output of these laser mapping systems can provide a tread surface map for a tire. The tread surface map includes a set of data points providing a measure of tread height for a plurality of points about the surface of the tire. The tread surface map can be analyzed to assess parameters of the tire tread surface. For instance, a tread surface map can be analyzed to assess wear characteristics of the tire tread surface, such as irregular wear characteristics of the tire tread.

Known techniques for analyzing a tread surface map include modeling the tread surface using mathematical curves, such as polynomial functions. For example, U.S. Pat. No. 5,249,460 is directed to a method and apparatus for measuring irregular tread wear. In this example, data obtained from a laser scanner is analyzed and compared to a reference curve by a curve-fitting process. The deviation between the actual data and the reference curve can be used to establish the degree of irregular wear of the tire.

Using curve fitting techniques, such as polynomial curve fitting techniques, in analysis of tire tread surface data suffers several drawbacks. For example, the order of the polynomial or mathematical function must be adapted to the particular tire type, such as a truck tire versus a car tire. In many cases, the mathematical functions used to model the tire tread surface are difficult to fit with the tread surface data, leading to inaccuracies. Accuracy of the mathematical model can be increased by, for instance, increasing the degrees of freedom of the polynomial function. This, however, results in increased complexity and can lead to instability risks in fitting the mathematical function. In addition, the use of mathematical functions to model the tread surface data often do not account for discontinuities in the data or asymmetries between the left and right sides of the tire.

Thus, a need exists for an improved system and method of analyzing tire tread surface data to assess parameters of a tread of a tire, such as irregular wear characteristics of a tread of tire.

SUMMARY OF THE INVENTION

Aspects and advantages of the invention will be set forth in part in the following description, or may be apparent from the description, or may be learned through practice of the invention.

One exemplary aspect of the present disclosure is directed to a method for analyzing tread surface data to assess one or more parameters of a tread of a tire. The method can include obtaining a tread surface map for the tread of the tire. The tread surface map includes a plurality of data points. Each data point provides a tread height for the tread of the tire. The method further includes processing, with a computing device, the tread surface map to generate a convex hull. The convex hull includes a three-dimensional shell that wraps the tread surface map. The convex hull is convex at all points around the convex hull. The method further includes determining, with the computing device, a relative tread depth map based at least in part on the tread surface map and the convex hull and analyzing the relative tread depth map to assess one or more parameters of the tread of the tire.

Another exemplary aspect of the present disclosure is directed to a system for analyzing tread surface data to assess one or more parameters of a tread of a tire. The system includes a laser probe adapted to measure a tread surface map of the tread of the tire. The tread surface map includes a plurality of data points. Each data point provides a tread height for the tread of the tire. The system further includes a computing system having one or more processors and one or more computer-readable media. The one or more processors are configured to execute computer-readable instructions stored in the one or more computer-readable media to cause the one or more processors to perform operations. The operations include processing the tread surface map to generate a convex hull. The convex hull includes a three-dimensional shell that wraps the tread surface map. The convex hull is convex at all points around the convex hull. The operations further include determining a relative tread depth map based at least in part on the tread surface map and the convex hull and analyzing the relative tread depth map to assess one or more parameters of the tread of the tire.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Generally, the present disclosure is directed to systems and methods for analyzing tread surface data to assess tire tread parameters, such as irregular wear characteristics of a tire tread. More particularly, tread surface data, such as a tread surface map, can be processed to generate a convex hull for the tire. The convex hull can approximate the convex outer surface of the tire. The convex hull can represent the expected wear characteristics of the tire. The convex hull can be used as a reference for analyzing the tread surface data. In particular, irregular wear zones in the tire tread can be mathematically concave relative to the convex hull. Thus, comparing the tread surface data to the convex hull can reveal information indicative of irregular wear characteristics of the tire. For instance, the local depth of the measured tread surface data relative to the convex hull can provide a quantitative measure of irregular wear characteristics of the tire.

More particularly, a tread surface map can be obtained for a tread of a tire. The tread surface map can be obtained using any suitable data capture device. For instance, the tread surface map can be obtained from a mapping device that uses a laser probe or other probe (e.g. a sonic probe, optical probe, video probe, or other suitable probe) to map the tread surface of a tire. The tread surface map can have a plurality of data points providing a tread height defined in a measurement direction that is parallel to a radial axis of the tire, such as in a measurement direction defined by the probe.

After optional filtering of the tread surface data, the tread surface map can be processed to generate a convex hull providing a convex contour of the tire tread. The convex hull can be convex at all points about the convex hull. In a particular implementation, the convex hull can be generated from the tread surface map using a Delaunay triangulation process. The Delaunay triangulation process models the convex hull as a plurality of Delaunay triangles. More particularly, the Delaunay triangulation process can compute a set of Delaunay triangles from the data points in the tread surface map such that no data point is located inside a semicircle passing through the vertices of any Delaunay triangle in the set of Delaunay triangles.

Once the convex hull is generated, a relative tread depth map can be determined based on the tread surface map and the convex hull. The relative tread depth map can be indicative of the tread heights of the tread surface map relative to the tread heights defined by the convex hull. For instance, the relative tread depth map can be determined as the difference between the convex hull and the tread surface map. The reference (i.e. the zero value) of the relative tread depth map corresponds to the location of the convex hull. Points that are below the convex hull can be indicative of grooves in the tire tread as well as areas of irregular wear. The areas of irregular wear can be distinguished from the grooves, for instance, by identifying points in the relative tread depth map corresponding to depths of less than a threshold depth (e.g. 2 mm) below the reference.

Figure 1:
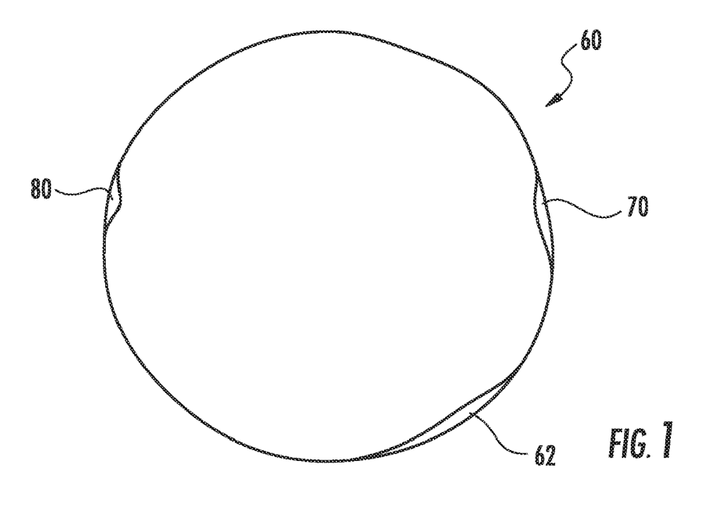
FIG. 1 depicts a simplified representation of tread surface data relative to a convex hull according to an exemplary embodiment of the present disclosure.

For instance, FIG. 1 depicts a simplified representation of a convex hull 60 relative to the measured tread surface data 62 of a tire 60. As depicted, the convex hull 70 is convex at all points about the tire circumference. The tread surface data 62, however, includes concave regions relative to the convex hull 70. For instance, the tread surface data 62 can include a concave region 80. The concave regions of the tread surface data 62 can be representative of irregular wear. Accordingly, areas of irregular wear can be readily identified by a relative tread depth map which is indicative of the relationship of the tread surface data 62 relative to the convex hull 70.

According to particular aspects of the present disclosure, the tread surface map can be modified prior to generating the convex hull to improve the analysis of the tread surface map. For instance, in one implementation, the tread surface map can be extended circumferentially to avoid edge effects in the generation of the convex hull. In another implementation, the edges associated with the outside shoulders of the tread surface map can be modified to improve the detection of irregular wear at the shoulders relative to the convex hull. In another implementation, the tread surface map can be subjected to a bending process to accommodate any concavity located at the center of the tire tread due to normal wear profiles. In still another implementation, the tread surface map can be compacted to a fraction of the circumference of the tread to provide a more accurate analysis of the tread surface map relative to the convex hull.

Exemplary System for Analyzing Tread Surface Data

Figure 2:
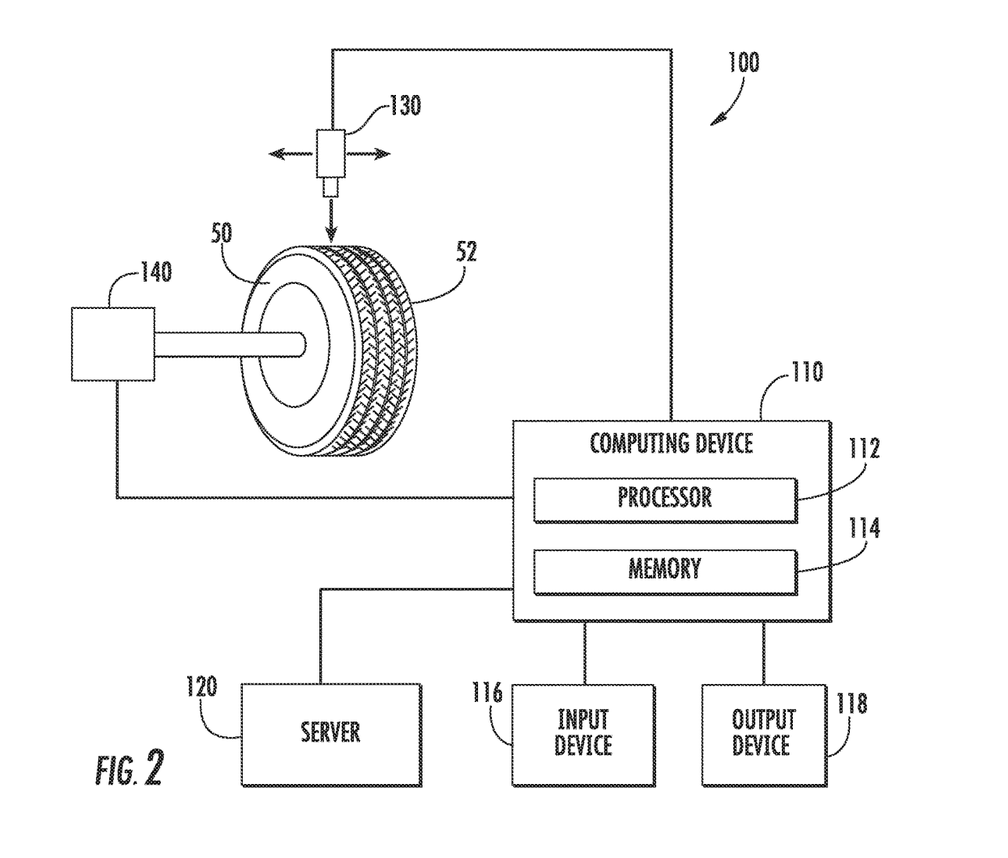
FIG. 2 depicts an exemplary system for analyzing tread surface data according to an exemplary embodiment of the present disclosure.

FIG. 2 depicts an exemplary system 100 for analyzing characteristics of a tire 50 according to an exemplary embodiment of the present disclosure. The system 100 includes a laser probe 130 for measuring data associated with the tread 52 (e.g. tread heights) of the tire 50. The laser probe 130 can be any suitable device that can acquire tread height data using a laser, such as a laser probe used in the TMM-570 tire measurement machine manufactured by Wolf & Beck. The data acquired by the laser probe 130 can be provided to the computing device 110, which processes the data to assess one or more parameters of the tread 52, such as irregular wear characteristics. While the present disclosure will be discussed with reference to a laser mapping system that uses a laser probe 130 to acquire tread data for the tread 52, those of ordinary skill in the art, using the disclosures provided herein, will understand that the techniques according to exemplary embodiments of the present disclosure can be used for tread data obtained from any suitable source or mapping system, such as a sonic probe, optical probe, video probe (using stereo correlation imaging techniques), or other probe or device.

The laser probe 130 can collect data associated with tread height (e.g. distance from the laser probe to the tread surface) using a laser mapping process by impinging the surface of the tread 52 with a laser beam as the tire 50 is rotated using a rotator device 140, such as a stepper motor. The laser probe 130 can be positioned at a first lateral position relative to the width of the tread 52 as the tire 50 is rotated to acquire tread height data about the circumference of the tread 52 at the first lateral position. After the tire 50 has completed one rotation, the laser probe 130 can be shifted to a second lateral position relative to the width of the tread 52 to acquire tread heights for a plurality of data points about the circumference of the tread 52 at the second lateral position. This process can be repeated until the laser probe 130 has acquired sufficient data to map tread heights representative of the entire tread 52 of the tire 50. For instance, in one example, the laser probe 130 can acquire data at a resolution of about 1 mm×1 mm. The data acquired by the laser probe can be accurate to within about 0.1 mm of tread height.

Figure 3:
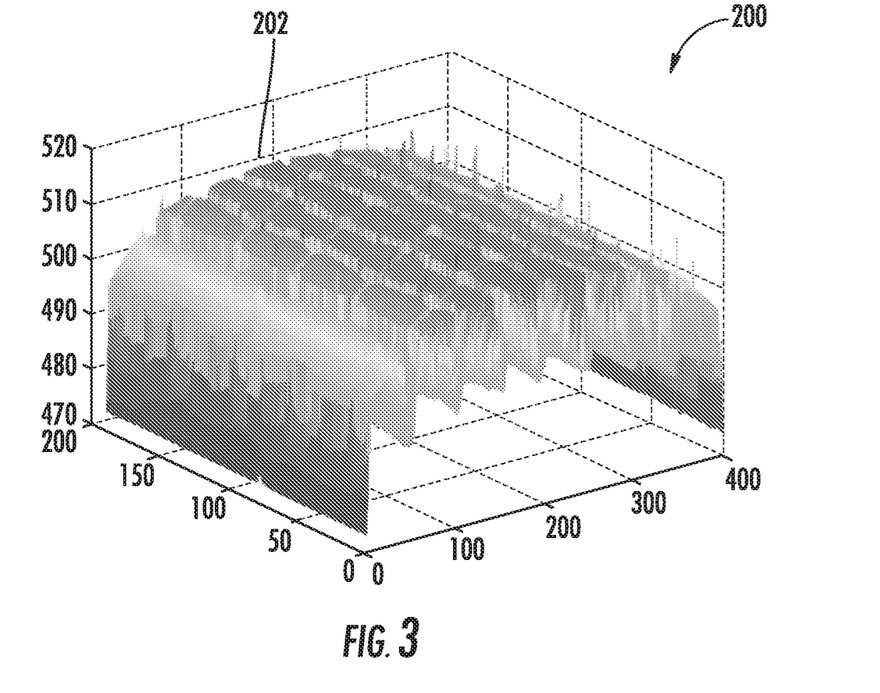
FIG. 3 depicts a tread surface map to be processed according to an exemplary embodiment of the present disclosure.

The data acquired by the laser probe 130 during the laser mapping process can be represented as a tread surface map. FIG. 3 depicts a three-dimensional graphical representation of an exemplary raw tread surface map 200 obtained for a tread according to an exemplary embodiment of the present disclosure. FIG. 3 plots the tread surface map 200 with the longitudinal circumferential direction of the tread along the abscissa, the lateral width of the tread along the ordinate, and the tread height along the applicate. The tread surface map 200 includes a plurality of data points 202. Each data point 202 is associated with a discrete location on the tread of a tire. Each data point 202 provides a tread height for the discrete location.

Referring back to FIG. 2, the computing device 110 can control the laser probe 130 and the rotator device 140 to implement the laser mapping process. The computing device 110 can be any suitable computing device, such as a desktop, laptop, general purpose computing device, special purpose computing device, mobile device, tablet, or other suitable machine capable of automated computations. The computing device 110 can include one or more processor(s) 112 and at least one memory 114. The one or more processor(s) 112 can be any suitable processing device, such as a microprocessor, microcontroller, or other suitable processing device. The memory 114 can be any suitable computer-readable medium or media including non-transitory computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, magnetic-based storage media, optical storage media and others.

The memory 114 can store information accessible by processor(s) 112, including instructions that can be executed by processor(s) 112. The instructions can be any set of instructions that when executed by the processor(s) 112, cause the processor(s) 112 to provide desired functionality, such as implementing the method disclosed in FIG. 4. The instructions can be implemented in hardware, application specific circuits, firmware and/or software. When software is used, any suitable programming, scripting, or other type of language or combinations of languages may be used to implement the functionality disclosed herein.

The computing device 110 of FIG. 2 can be adapted to function as a special-purpose machine providing desired functionality by executing the instructions with the processor(s) 112. For example, the processor(s) 112 can execute instructions stored in the memory 114 to cause the processor to obtain data collected by the laser probe 130 through one or more communication links. Processor(s) 112 can then process the data in accordance with the exemplary methods disclosed herein to provide useful output to a user. The processor(s) 112 can receive data input from a user through a suitable input device 116, such as through one or more of data entry keys, a touchscreen, a touchpad, a mouse, microphone for voice recognition, or other suitable input device. The processor(s) 112 can provide data to user through a suitable output device 118, such as a display or other suitable device. The analysis techniques disclosed herein can also be implemented by one or more servers 120 or across multiple computing and processing devices.

Exemplary Method for Analyzing Tread Surface Data

Figure 4:
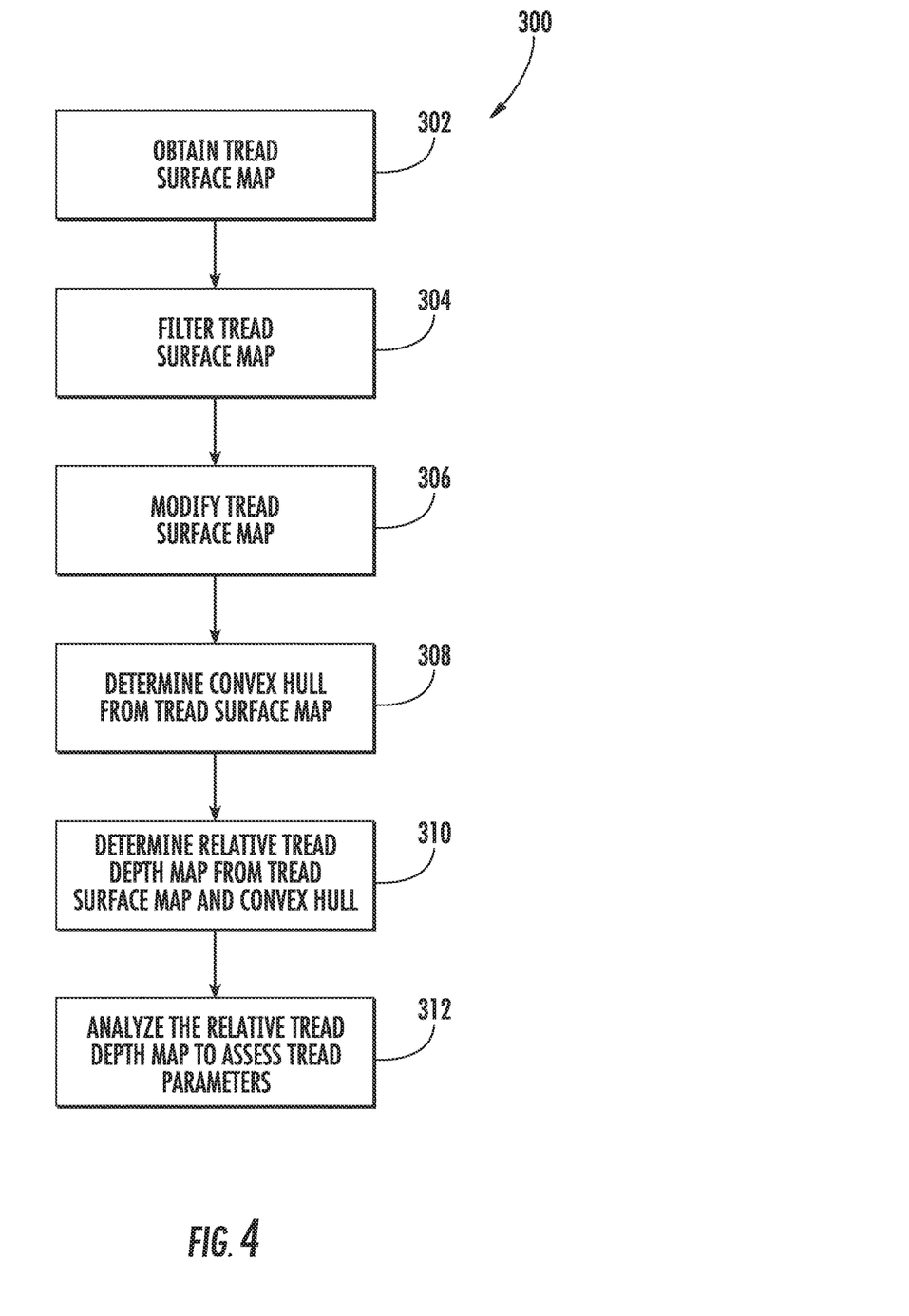
FIG. 4 depicts flow diagram of an exemplary method for analyzing tread surface data according to an exemplary embodiment of the present disclosure.

FIG. 4 depicts a flow diagram of an exemplary method (300) that can be used to transform a raw tread surface map according to an exemplary embodiment of the present disclosure. The method (300) can be implemented using any suitable computing device, such as the computing device 110 of FIG. 2. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (302), the method includes obtaining a tread surface map for a tire, such as the tread surface map 200 of FIG. 3. The tread surface map can be obtained (e.g. received) from any suitable device or component across any suitable interface. In one example, the computing device 110 of FIG. 2 obtains the tread surface map from the laser probe 130. The tread surface map includes a plurality of data points providing a tread height for the tread of the tire defined in a measurement direction that is parallel to a radial axis of the tire. The tread surface map can be measured using any suitable process, such as a laser mapping process, sonic mapping process, optical mapping process, video mapping process (using stereo correlation imaging techniques), or other suitable process.

Referring back to FIG. 4 at (304), the tread surface map can be filtered to condition the tread surface map for further processing. The filtering operation can be performed, for instance by the computing device 110 of FIG. 2. The filtering operation can remove outliers and decrease noise in the tread surface map. Any suitable filtering process can be used to condition the tread surface map without deviating from the scope of the present disclosure. As one example, outliers or data points associated with tread heights that are too far from the median heights can be identified. The peak tread heights associated with the identified data points can be replaced with median tread heights. In addition and/or in the alternative, a nonlinear diffusion filter, such as a Perona-Malik filter, can be used to decrease noise level in plateau areas of the tread surface map without smoothing the edges.

Referring to FIG. 4, the method includes at (306) modifying the tread surface map to make the tread surface map suitable for generating a convex hull. More particularly, the tread surface map can be modified in various ways to better reveal irregular wear characteristics. A number of techniques are available for modifying the tread surface map according to aspects of the present disclosure.

One exemplary technique for modifying the tread surface map includes extending the tread surface map in the circumferential direction. Extending the tread surface map in the circumferential direction can reduce some edge effects when determining the convex hull from the tread surface map. More particularly, Delaunay triangulation may not work well at the circumferential edges of the tread surface map. Extending the edges in the circumferential direction such that they overlap when wrapped around each other can improve the determination of a convex hull from the tread surface map using Delaunay triangulation.

Figure 5:
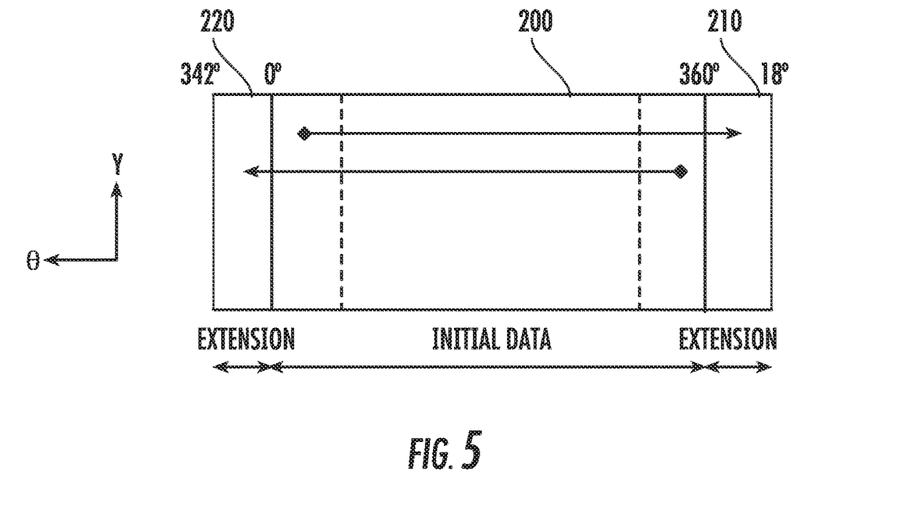
FIG. 5 depicts extending an exemplary tread surface map in a circumferential direction according to an exemplary embodiment of the present disclosure.

FIG. 5 depicts the exemplary extension of a tread surface map 200 in the circumferential direction according to an exemplary embodiment of the present disclosure. FIG. 5 plots the tread surface map 200 with the circumferential direction of the tread along the abscissa and the lateral width of the tread along the ordinate. The initial tread surface map 200 can be extended in the circumferential direction by a predetermined amount (e.g. 5%) at both circumferential ends of the initial tread surface map 200. The extensions at each circumferential end can include data points associated with the opposite circumferential end. For example, the extension 210 extending from the circumferential end associated with 360° can include the data points between 0° and 18° at the opposite end of the initial tread surface map 200. Similarly, the extension 220 extending from the circumferential end associated with 0° can include the data points between 342° and 360° at the opposite end of the initial tread surface map 200.

Other suitable techniques for modifying the tread surface map can include, for example: (1) modification of the outside shoulders of the tread surface map; (2) implementing a bending process to modify the tread surface map; and/or (3) modifying the angle scale of the tread surface map. Each of these exemplary techniques can improve the analysis of the tread surface map in various ways and will be discussed in greater detail below.

Referring back to FIG. 4 at (308), the method includes determining the convex hull from the tread surface map. The convex hull can be determined, for instance by the computing device 110 of FIG. 2. Determining the convex hull can include calculating a three-dimensional shell that wraps the entire surface of the tread while being only convex. One exemplary technique for determining the convex hull is Delaunay triangulation. Delaunay triangulation computes a plurality of Delaunay triangles from the data points in the tread surface map. For instance, the Delaunay triangulation process can compute a set of Delaunay triangles from the data points in the tread surface map such that no data point is located inside a semicircle passing through the vertices of any Delaunay triangle in the set of Delaunay triangles. The determined Delaunay triangles model the surface of the convex hull. Delaunay triangulation can be particularly suitable for determining a convex hull that is convex at all points about the convex hull.

The present disclosure is discussed with reference to Delaunay triangulation for purposes of illustration and discussion. Those of ordinary skill in the art, using the disclosures provided herein, will understand that other suitable processes can be used to determine a convex hull that is convex at all points about the convex hull without deviating from the scope of the present disclosure.

Figure 6:
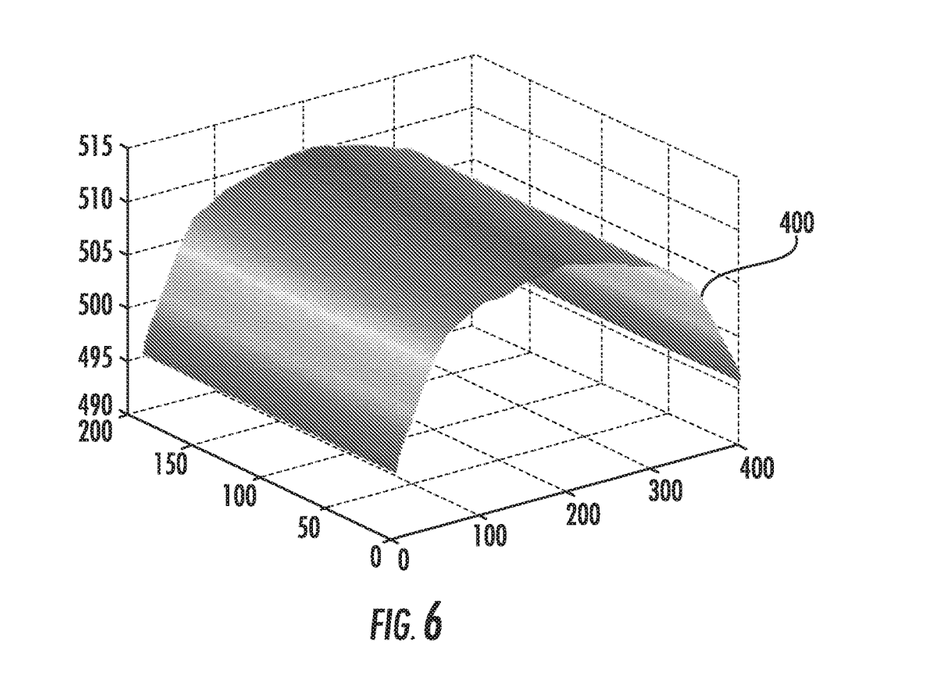
FIG. 6 depicts an exemplary convex hull obtained from a tread surface map according to an exemplary embodiment of the present disclosure.

FIG. 6 depicts an exemplary convex hull 400 determined from the tread surface map 200 of FIG. 3. FIG. 6 plots the convex hull 400 with the circumferential direction of the convex hull 400 along the abscissa, the lateral width of the convex hull 400 along the ordinate, and the height of the convex hull 400 along the applicate. The surface of the convex hull 400 can be represented as a plurality of Delaunay triangles determined for the data points in the tread map. Notice that the convex hull 400 is convex at all locations about the convex hull 400. The convex hull 400 can provide a suitable reference for identifying irregular wear characteristics and groove depth of a tread of a tire. The convex hull 400 can also be analyzed to assess other useful tire parameters, such as tire uniformity.

Figure 7:
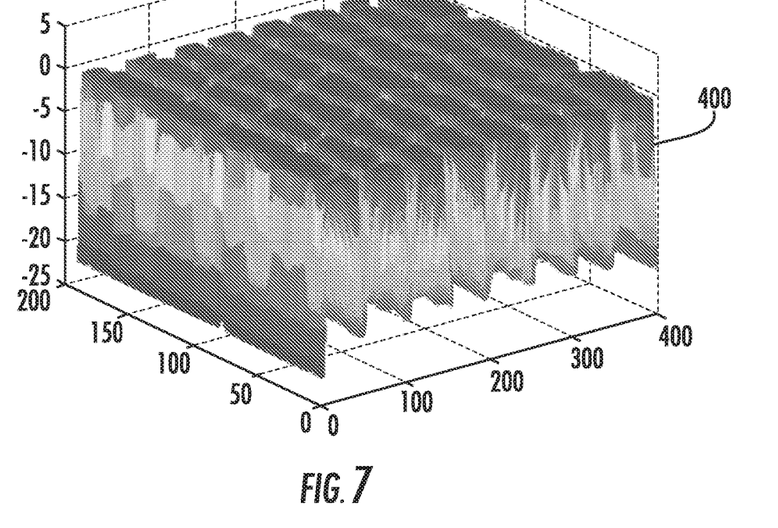
FIG. 7 depicts a three-dimensional representation of an exemplary relative tread depth map obtained according to an exemplary embodiment of the present disclosure.

Referring back to FIG. 4 at (310), a relative tread depth map is determined from the tread surface map and the convex hull. In particular, the relative tread depth map can be determined as the difference between the convex hull and the tread surface map. FIG. 7 depicts an exemplary three-dimensional relative tread depth map 410 determined based on the tread surface map 200 of FIG. 3 and the convex hull 400 of FIG. 6. FIG. 7 plots the relative tread depth map 410 with the circumferential direction of the tread along the abscissa, the lateral width of the tread along the ordinate, and the heights associated with data points of the relative tread depth map 410 along the applicate. The exemplary relative tread depth map 410 of FIG. 7 can be indicative of the tread heights of the data points of the tread surface map relative to the convex hull.

Referring back to FIG. 4 at (312), the relative tread depth map can be analyzed to assess one or more parameters of the tread of the tire. For instance, the relative tread depth map can be analyzed to quantify irregular wear characteristics of the tire or to determine groove depth of the tire. Because the relative tread depth map provides data indicative of the relationship between the convex hull and the tread surface map, the relative tread depth map can be analyzed to determine areas of concavity of the tread surface map relative to the convex hull. These areas of concavity can be representative of grooves in the tire tread or can be representative of areas of irregular wear. The grooves can be distinguished from the areas of irregular wear, for instance, by focusing the analysis on data points that are less than a threshold below the reference in the relative tread depth map.

Figure 8:
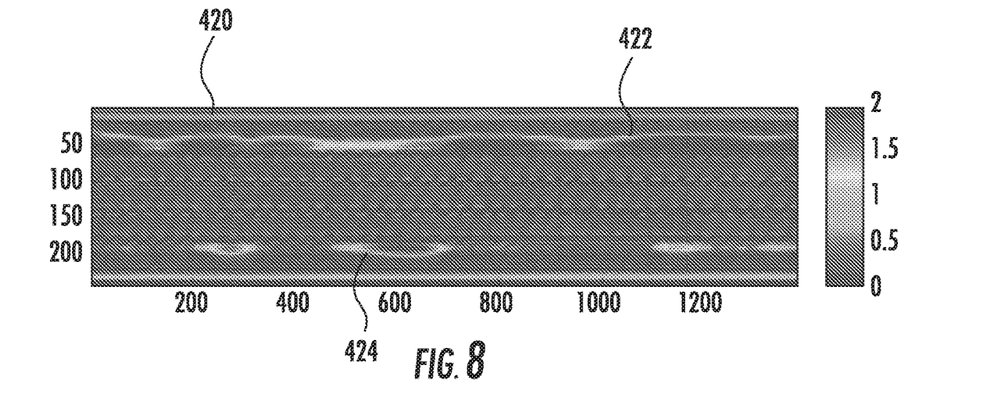
FIG. 8 depicts an exemplary relative tread depth map exhibiting irregular wear characteristics according to an exemplary embodiment of the present disclosure.

For example, FIG. 8 depicts an exemplary two-dimensional relative tread depth map 420 obtained according to an exemplary embodiment of the present disclosure. FIG. 8 plots the relative tread depth map 420 with the circumferential direction of the tread along the abscissa and the lateral width of the tread along the ordinate. Each data point in the relative tread depth map 420 is representative of the difference between the convex hull and the tread surface map. The zero of the relative tread depth map 420 is the reference and is representative of the location of the convex hull. Portions below zero are representative of grooves in the tread or of irregular wear in the tread. For instance, the portion 424 of the relative tread depth map can be greater than a threshold (e.g. 2 mm) below the zero reference and can therefore be associated with a groove in the tread. The portion 422 of the relative tread depth map 420 can be less than threshold (e.g. 2 mm) below zero and can thus be associated with an area of irregular wear.

The identified areas of irregular wear can be quantified using the relative tread depth map. For example, the volume of irregular wear, shape of irregular wear, length of irregular wear, width of irregular wear, depth of irregular wear, location of irregular wear, or other suitable parameters can be ascertained. The groove depth of identified grooves can also be determined from the relative tread depth map.

Exemplary Modification of Outside Shoulders of the Tread Surface Map

Exemplary techniques for modifying the tread surface map to improve the analysis will now be set forth. One exemplary technique involves modifying the outside shoulders of the tread surface map to facilitate the identification of irregular wear at the shoulders of the tire tread. The outside shoulders of a tread tend to be convex even if there is some irregular wear. Accordingly, a convex hull may not be suitable as a local reference for identifying areas of irregular wear at the shoulders. To improve this diagnostic, the tread surface map can be modified at the shoulders such that the convex hull determined from the tread surface map provides a better reference for identifying areas of irregular wear at the shoulders.

Figure 9:
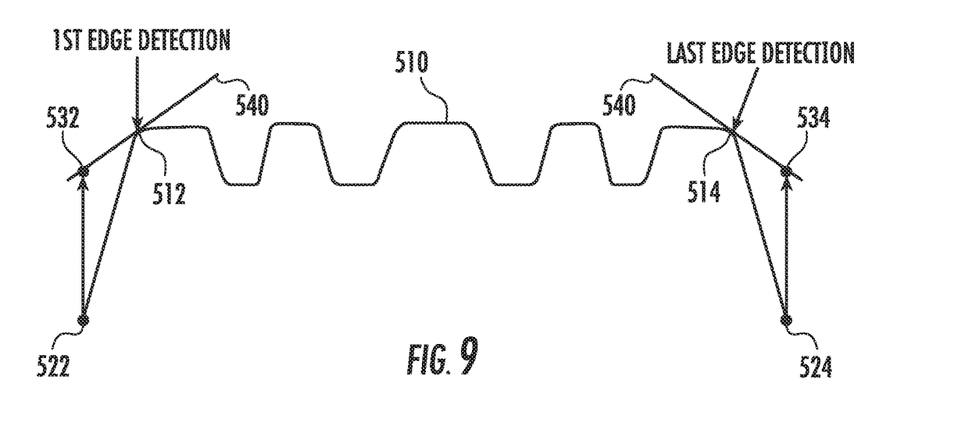
FIG. 9 depicts the exemplary modification of a tread surface map to accommodate the shoulders of the tire tread according to an exemplary embodiment of the present disclosure.

First, a profile of the tread surface map can be determined. The profile of the tread surface map can be an average profile for the tread surface map or can be the profile of the tread surface map at a particular circumferential location on the tire. FIG. 9 depicts an exemplary profile 510 determined from a tread surface map.

Once the profile is determined, a first limit of the profile is detected. The first limit can be detected by determining the slope at a plurality of points across the profile. The first limit can be detected as the first time the absolute value of the slope of the profile is lower than a threshold slope. For instance, referring to FIG. 9, the first limit 512 can be detected as the first time the slope of the profile is less than the threshold slope.

A second limit of the profile can then be detected. The second limit of the profile can be detected as the last time the absolute value of the slope of the profile is larger than the threshold slope. For instance, referring to FIG. 9, the second limit 514 can be detected as the last time the absolute value of the slope of the profile is larger than the threshold slope. The threshold slope can be set to any suitable value, such as 0.5 in the case of a passenger car tire or 1.0 in the case of a truck tire.

Once the first limit and the second limit of the profile have been determined, the first and last points of the profile are modified. More particularly, the first point of the profile is modified by performing a linear extrapolation of a straight line that intersects the first limit and has a slope equal to the threshold slope. The last point of the profile is similarly modified by performing a linear extrapolation of a straight line that intersects the second limit and has a slope equal to the negative of the threshold slope. For example, referring to FIG. 9, the first point 522 of the profile 510 can be modified to the point 532. The point 532 can be determined by extrapolating the line 540 having a slope equal to the slope threshold and intersecting the first limit 512. The last point 524 of the profile 510 can be modified to point 534 by extrapolating the line 542 having a slope equal to the negative of the slope threshold and intersecting the second limit 514.

Figure 10:
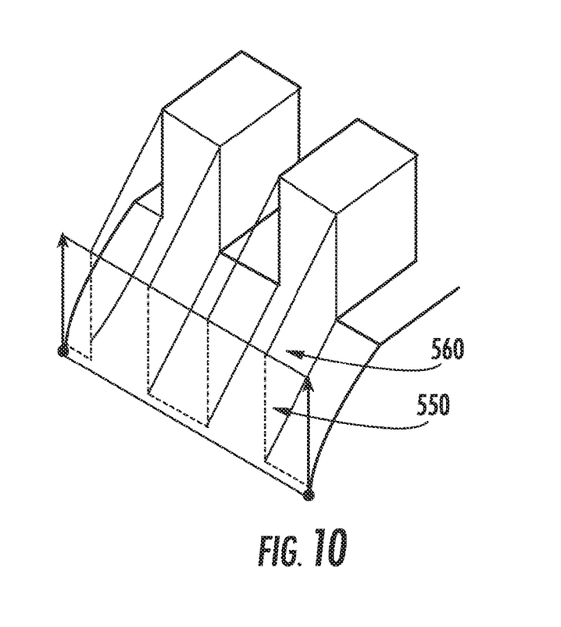
FIG. 10 depicts the application of an exemplary local maximum filter during modification of a tread surface map according to an exemplary embodiment of the present disclosure.

The modification of the tread surface map can be performed for a three-dimensional tread surface map. FIG. 10 depicts a three-dimensional modification of the tread surface map in a tread with open shoulders (i.e. the tread has shoulder ribs with lateral grooves). As shown, the initial extrapolated shoulder profile 550 mirrors the lateral grooves. To remedy this, a local maximum filter can be applied when modifying the points at the shoulders of the tread surface map. The filtered profile 560 is obtained after applying a local maximum filter. All of the points at the shoulders of the tread surface map can be modified to match the filtered profile 560. In this way, the modification of the tread surface map with shoulders having lateral grooves can be improved.

Exemplary Bending Process for Modification of Tread Surface Map

Another exemplary technique for modifying the tread surface map involves bending the tread surface map according to a bending process to accommodate center concavity of the tire tread. Certain tires can have significant center wear profiles as part of the regular wear characteristics of the tire. A goal of the bending process is to prevent the center wearing from being identified as irregular wear. To remove the center wearing from the analysis, the tread surface map is bent according to a bending process before determining the convex hull from the tread surface map.

Figure 11:
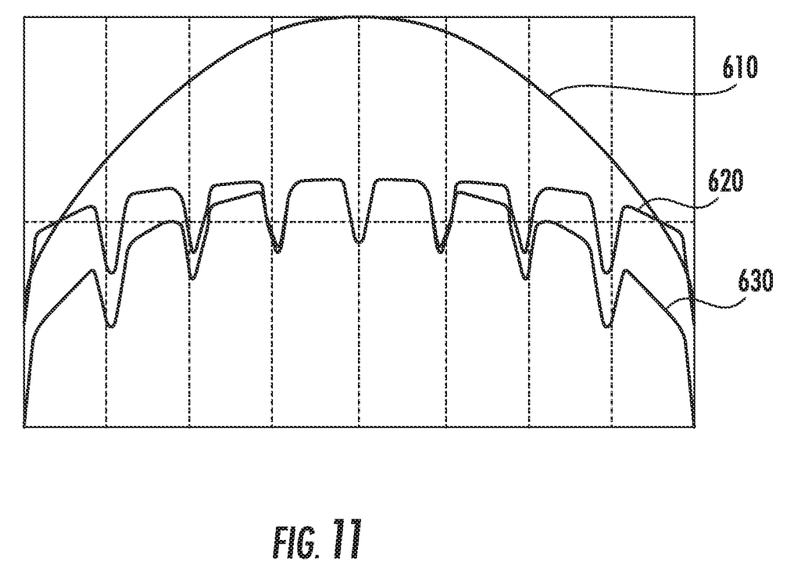
FIG. 11 depicts the modification of a tread surface map using a bending process according to an exemplary embodiment of the present disclosure.

To implement the bending process, a bending curve having a maximum at the center of a profile of the tread surface map can be determined. For instance, referring to FIG. 11, the bending curve 610 can be determined. As demonstrated, the bending curve 610 has a maximum at the center of the tread surface map. A quadratic bending curve 610 is depicted in FIG. 11 for purposes of illustration and discussion. Other suitable bending curves can be used without deviating from the scope of the present disclosure.

Once the bending curve is determined, the tread surface map can then be modified by determining the difference between the tread surface map and the bending curve. For instance, referring to FIG. 11, the bent tread surface map 630 can be determined by subtracting the tread surface map 620 from the bending curve. The convex hull can then be determined from the bent tread surface map 630. The convex hull determined from the bent tread surface map 630 be a suitable reference for taking into account the regular center wear profiles of a tire tread.

Exemplary Modification of the Angular Extent of Tread Surface Map

Yet another exemplary technique for modifying the tread surface map involves compacting the angular extent of the tread surface map. A convex hull determined from the tread surface data includes a plurality of straight surfaces (e.g. surfaces of the Delaunay triangles) to model a curved surface. This can result in some inaccuracies in quantifying irregular wear.

Figure 12:
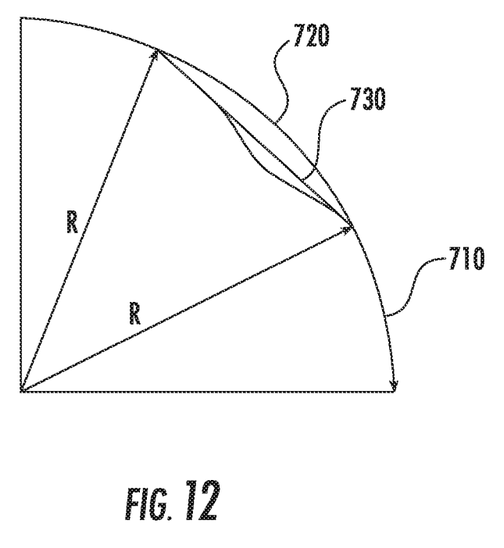
FIG. 12 depicts exemplary inaccuracies in assessing tread height relative to a convex hull obtained according to an exemplary embodiment of the present disclosure.

For instance, FIG. 12 depicts a two-dimensional representation of a measured tire profile 710 relative to a perfect circle 720 and relative to a linear surface 730 approximated by a convex hull. As shown, the depth of the concavity of the tire profile relative to the perfect circle differs from the depth of the concavity relative to the linear surface 730. This error increases as the length of the linear surface 730 increases.

Figure 13:
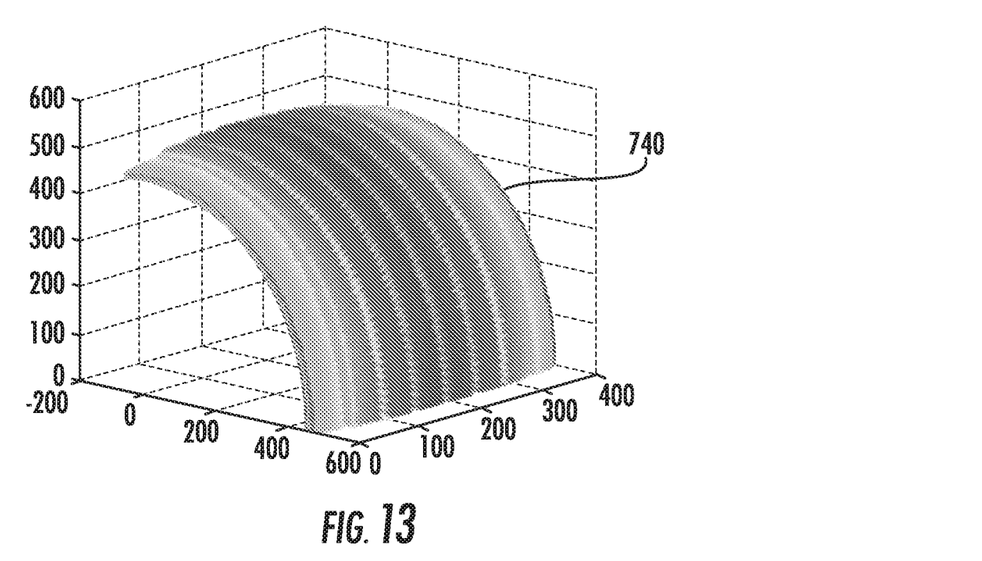
FIG. 13 depicts an exemplary compacted tread surface map according to an exemplary embodiment of the present disclosure.

To decrease this error, the length of the linear surfaces 730 of the convex hull can be reduced. This can be accomplished by compacting the tread surface data to a fraction of the angular extent of the circumference of the tread. For instance, the tread surface data can be compacted from extending from 0° to 360° to extending from 0° to 90°. Other suitable compaction ratios can be used without deviating from the scope of the present disclosure. FIG. 13 depicts an exemplary compacted tread surface map 740 that has been compacted from 0° to 360° to 0° to 90°. FIG. 13 plots the compacted tread surface map with the longitudinal circumferential direction of the tread along the abscissa, the lateral width of the tread along the ordinate, and the tread height along the applicate.

Figure 14:
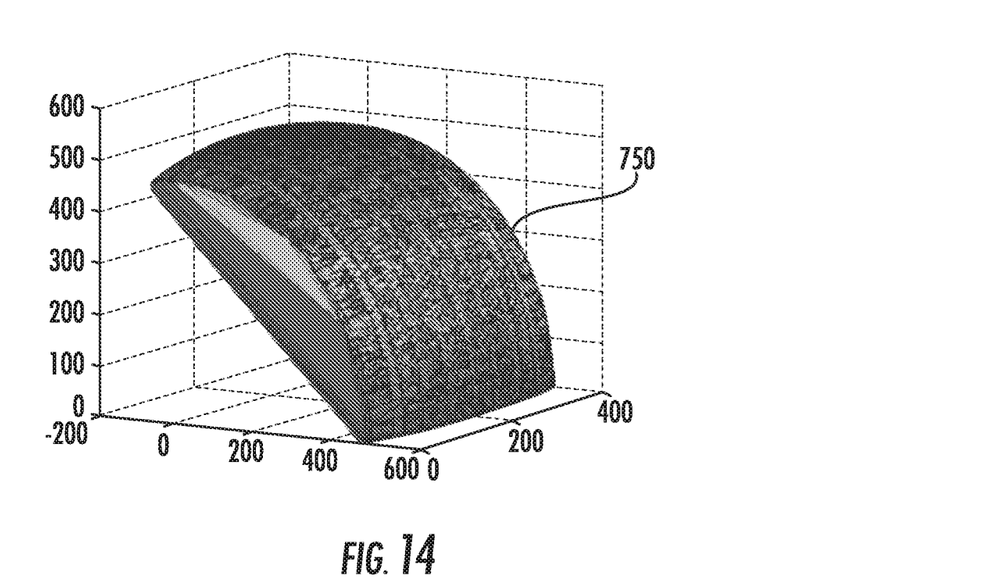
FIG. 14 depicts an exemplary convex hull obtained for a compacted tread surface map according to an exemplary embodiment of the present disclosure.

Compacting the tread surface data decreases the distance between data points in tread surface map. As a result, the length of the linear surface of the convex hull determined from the data points can be reduced. For instance, FIG. 14 depicts the convex hull 750 (including the plurality of Delaunay triangles) determined from the compacted tread surface map 740 of FIG. 13. FIG. 14 plots the compacted tread surface map with the longitudinal circumferential direction of the convex hull along the abscissa, the lateral width of the convex hull along the ordinate, and the heights associated with the convex hull along the applicate. As demonstrated, the length of the individual triangles used to model the surface of the convex hull 750 is reduced. Reducing the length of the surfaces of the convex hull can lead to more accurate analysis of irregular wear.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for assessing one or more parameters of a tread of a tire, comprising:
   obtaining a tread surface map for the tread of the tire using a laser probe adapted to measure the tread of the tire, the tread surface map comprising a plurality of data points, each data point providing a tread height for the tread of the tire;
   processing, with one or more computing devices, the tread surface map to generate a convex hull, the convex hull comprising a three-dimensional shell that wraps the tread surface map, the convex hull being convex at all points around the convex hull;
   determining, with the one or more computing devices, a relative tread depth map based at least in part on the tread surface map and the convex hull, the relative tread depth map being determined as the difference between the convex hull and the tread surface map; and
   analyzing, with the one or more computing devices, the relative tread depth map to assess one or more parameters of the tread of the tire;
   wherein processing the tread surface map to generate a convex hull comprises performing a Delaunay triangulation process on the tread surface map, wherein the Delaunay triangulation process models the convex hull as a plurality of Delaunay triangles.

2. The method of claim 1, wherein the method comprises filtering the tread surface map.

3. The method of claim 1, wherein the method comprises modifying the tread surface map prior to processing the tread surface map to generate the convex hull.

4. The method of claim 3, wherein modifying the tread surface map prior to processing the tread surface map to generate a convex hull comprises extending the tread surface map in the circumferential direction.

5. The method of claim 3, wherein modifying the tread surface map prior to processing the tread surface map to generate a convex hull comprises:
   determining a profile of the tread surface map;
   detecting a first limit of the profile of the tread surface map by comparing the slope of the profile to a threshold slope;
   detecting a second limit of the profile of the tread surface map by comparing the slope of the average profile to the threshold slope;
   modifying a first point on the tread surface map by performing a linear extrapolation of a straight line that starts at the first limit and has a slope equal to the threshold slope; and
   modifying a second point on the tread surface map by performing a linear extrapolation of a straight line that starts at the second limit and has a slope equal to the threshold slope.

6. The method of claim 5, wherein modifying the first point on the tread surface map and modifying the second point on the tread surface map comprises implementing a local maximum filter.

7. The method of claim 3, wherein modifying the tread surface map prior to processing the tread surface map to generate a convex hull comprises:
   determining a bending curve having a maximum at the center of a profile of the tread surface map; and
   modifying the tread surface map by determining the difference between the tread surface map and the bending curve.

8. The method of claim 3, wherein modifying the tread surface map prior to processing the tread surface map to generate a convex hull comprises compacting the tread surface map to extend along a fraction of a circumference of the tread.

9. The method of claim 1, wherein the tread surface map is generated from a laser probe, sonic probe, optical probe, or video probe.

10. The method of claim 1, wherein the one or more parameters of the tread of the tire comprise irregular wear characteristics of the tread of the tire.

11. The method of claim 1, wherein the one or more parameters of the tread of the tire comprise a groove depth of the tread of the tire.

12. A system for assessing one or more parameters of a tread of a tire, the system comprising:
   a laser probe adapted to measure a tread surface map of the tread of the tire, the tread surface map comprising a plurality of data points, each data point providing a tread height for the tread of the tire;
   a computing system having one or more processors and one or more computer-readable media, the one or more processors configured to execute computer-readable instructions stored in the one or more computer-readable media to cause the one or more processors to perform operations, the operations comprising:

processing the tread surface map to generate a convex hull, the convex hull comprising a three-dimensional shell that wraps the tread surface map, the convex hull being convex at all points around the convex hull;

determining a relative tread depth map based at least in part on the tread surface map and the convex hull, the relative tread depth map being determined as the difference between the convex hull and the tread surface map; and analyzing the relative tread depth map to assess one or more parameters of the tread of the tire;

wherein the operation of processing the tread surface map to generate a convex hull comprises performing a Delaunay triangulation process on the tread surface map, the Delaunay triangulation process modeling the convex hull as a plurality of Delaunay triangles.

13. The system of claim 12, wherein the operations further comprise modifying the tread surface map prior to processing the tread surface map to generate the convex hull.

14. The system of claim 13, wherein the operation of modifying the tread surface map prior to processing the tread surface map to generate the convex hull comprises:

determining a profile of the tread surface map;

detecting a first limit of the profile of the tread surface map by comparing the slope of the profile to a threshold slope;

detecting a second limit of the profile of the tread surface map by comparing the slope of the average profile to the threshold slope;

modifying a first point on the tread surface map by performing a linear extrapolation of a straight line that starts at the first limit and has a slope equal to the threshold slope; and modifying a second point on the tread surface map by performing a linear extrapolation of a straight line that starts at the second limit and has a slope equal to the threshold slope.

15. The system of claim 13, wherein the operation of modifying the tread surface map prior to processing the tread surface map to generate the convex hull comprises:

determining a bending curve having a maximum at the center of a profile of the tread surface map; and modifying the tread surface map by determining the difference between the tread surface map and the bending curve.

16. The system of claim 13, wherein the operation of modifying the tread surface map prior to processing the tread surface map to generate the convex hull comprises compacting the tread surface map to extend along a fraction of a circumference of the tread.

* * * * *